US007661606B2

(12) United States Patent
Vacher

(10) Patent No.: US 7,661,606 B2
(45) Date of Patent: Feb. 16, 2010

(54) AUTOMATED SPRAY GUN FITTED WITH A SPRAY SYSTEM MOUNTED ON A FEED FOUNDATION

(75) Inventor: Eric Vacher, Valence (FR)

(73) Assignee: ITW Surfaces & Finitions, Valence (FR)

( * ) Notice: Subject to any disclaimer, the term of this patent is extended or adjusted under 35 U.S.C. 154(b) by 246 days.

(21) Appl. No.: 11/571,958

(22) PCT Filed: Jul. 6, 2005

(86) PCT No.: PCT/IB2005/001921

§ 371 (c)(1), (2), (4) Date: Jan. 11, 2007

(87) PCT Pub. No.: WO2006/006055

PCT Pub. Date: Jan. 19, 2006

(65) Prior Publication Data

US 2007/0210184 A1 Sep. 13, 2007

(30) Foreign Application Priority Data

Jul. 12, 2004 (FR) .................................. 04 07749

(51) Int. Cl.

*B05B 1/28* (2006.01)
*A01G 27/00* (2006.01)
*B05B 7/10* (2006.01)
*B05B 7/06* (2006.01)
*B05B 1/00* (2006.01)

(52) U.S. Cl. ......................... 239/296; 239/290; 239/67; 239/69; 239/70; 239/600; 239/406; 239/424

(58) Field of Classification Search ................. 239/290, 239/296, 67, 69, 70, 106, 301, 600, 291, 239/292, 293, 294, 295, 297, 298, 299, 300, 239/406, 424

See application file for complete search history.

(56) References Cited

U.S. PATENT DOCUMENTS 4,785,996 A * 11/1988 Ziecker et al. .............. 239/298
4,969,602 A * 11/1990 Scholl ........................ 239/298
RE33,481 E * 12/1990 Ziecker et al. .............. 239/298
5,169,071 A * 12/1992 Boger et al. ................ 239/296
5,292,068 A * 3/1994 Raterman et al. ............. 239/11
5,344,078 A * 9/1994 Fritz et al. .................. 239/296
5,456,414 A * 10/1995 Burns et al. ................. 239/296

(Continued)

FOREIGN PATENT DOCUMENTS

DE 29802610 U1 * 4/1998

(Continued)

OTHER PUBLICATIONS

Technik systeme kuechen schloesser baender, pp. 252, 253, 256 and 257.

*Primary Examiner*—Len Tran
*Assistant Examiner*—Steven Cernoch
(74) *Attorney, Agent, or Firm*—Lowe Hauptman Ham & Berner LLP

(57) ABSTRACT

An automated spraygun includes a spray/atomization body mounted on a feed foundation. The spraygun includes tensile locking elements between the spray body and the foundation.

12 Claims, 4 Drawing Sheets

U.S. PATENT DOCUMENTS

| | | | | | |
|---|---|---|---|---|---|
| 5,740,963 | A * | 4/1998 | Riney et al. | 239/299 |
| 6,024,299 | A * | 2/2000 | Drozkowski | 239/290 |
| 6,264,113 | B1 * | 7/2001 | Dingler | 239/8 |
| 6,511,301 | B1 * | 1/2003 | Fugere | 417/359 |
| 6,619,566 | B2 * | 9/2003 | Gressett et al. | 239/296 |
| 6,676,038 | B2 * | 1/2004 | Gressett et al. | 239/296 |
| 6,685,106 | B1 * | 2/2004 | van der Steur | 239/296 |
| 2004/0124251 | A1 * | 7/2004 | Gressett et al. | 239/1 |

FOREIGN PATENT DOCUMENTS

| | | | |
|---|---|---|---|
| DE | 29802610 | | 5/1998 |
| DE | 29905689 | U1 * | 6/1999 |
| DE | 29905689 | | 7/1999 |
| DE | 10242787 | | 4/2004 |
| EP | 0310358 | | 4/1989 |
| EP | 0539971 | A | 5/1993 |
| EP | 0841097 | | 4/2002 |
| FR | 2674773 | A1 | 10/1992 |
| FR | 2788231 | A1 | 7/2000 |
| FR | 2839663 | A1 | 11/2003 |

* cited by examiner

AUTOMATED SPRAY GUN FITTED WITH A SPRAY SYSTEM MOUNTED ON A FEED FOUNDATION

RELATED APPLICATIONS

The present application is a National Phase entry of International Application Number PCT/IB2005/001921, filed Jul. 6, 2005, which claims priority from, French Application Number 0407749, filed Jul. 12, 2004, the disclosures of which are hereby incorporated by reference herein in their entirety.

TECHNICAL FIELD

The present invention relates to an automated spraygun to spray paints, lacquers, enamels or similar products.

BACKGROUND OF THE INVENTION

It is known that an automated spraygun comprises a body generally of two or three parts, and a chamber receiving a pressurized product that shall be sprayed and communicating with a spray orifice at the front of the spraygun. This product chamber is crossed by a needle which is fitted at its fore end with a tip able to seal said orifice, said needle being driven by pressurized gas. Moreover the head of the spraygun may be fitted with vents that are situated on each side of the orifice and are fed in parallel with pressurized gas. On one hand these vents atomize the pressurized product issuing from the central orifice and on the other hand they shape the spray jet into a plane or round sheet.

Several feed conduits pass through the body of the spraygun in order to move the product that must be sprayed/atomized and also to apply various pressurized gas feeds. Illustratively one spraygun body may comprises five distinct feeds, namely one feed of the product that must be sprayed, one recycling return conduit of said product, one controlled feed of pressurized gas, one pressurized gas feed passing through the atomizing vents and one pressurized gas feed for the jet shaping vents.

As regards known sprayguns, the gun's body is mounted on and affixed to a hookup foundation to feed tubes in order to allow easy spraygun assembly and disassembly while averting disconnecting all tubings in the course of cleaning, maintenance or changing a spraygun.

To reduce the time spent on such maintenance operations, quick connect/disconnect means of the bayonet type already have been used whereby the spraygun body is assembled onto said foundation and then is locked by being rotated it (by a fraction of a revolution). The spraygun body's rest surface receiving the feed conduit orifices comprises a boss having side studs entering a housing with helical ramps implementing quarter-turn locking, said housing having been milled into a seating face of said foundation, said face comprising feed conduits which are complementary to those of the spraygun seals. Seals are installed between the respective feed conduits when the spraygun body is mounted on the foundation and are configured at the orifice peripheries between the support face and the seating face. Assembly takes place by configuring the spraygun body transversely to the foundation to move the stub together with its studs into the housing and matching notches and then rotating the spraygun body about such an axis until a distal spraygun portion shall be blocked by a stop when the faces and the respective orifices of body and foundation are coincident.

Be it borne in mind that the seals inserted between the seating and rest faces are subjected to friction and shearing when the spraygun body is rotated on and clamped to the foundation. These stresses very rapidly degrade the seals by abrading their surface and the sharp orifice edges entail danger of pinching or cutting the sheared seals.

SUMMARY OF THE INVENTION

The objective of the present invention is to remedy these drawbacks by creating an improved and quick locking system of a spraygun body onto a foundation to eliminate seal degradation and to preclude any product or pressurized gas leak into the feed conduits.

In the present invention therefore, the automated spraygun—for a product such as a paint, lacquer, enamel or similar—comprising:

a spraygun body that includes several first conduits feeding a product to be sprayed and a pressurized gas, furthermore a rest face into which said first feed conduits issue in the form of first orifices;

a foundation including a seating face against which is forced said rest face, furthermore several second feed conduits that are complementary to said first feed conduits and terminating on one hand into connection elements to pressurized gas spray product feeds and on the other hand into second orifices in said seating face, said first and second orifices being configured in a manner that each first orifice shall coincide with a respective second orifice when said spraygun body rest face is forced against said foundation seating face;

seals inserted between said seating and rest faces and peripherally located at each junction between a first and a second orifice respectively; and means allowing quick assembly and locking of said spraygun body to said foundation, is characteristic in that said rapid assembly and locking means comprise:

means positioning said spraygun body on said face and designed to project perpendicularly from one of said faces and to translate orthogonally into the other of said faces in a manner to position said rest face relative to said foundation face in their plane;

a locking stub projecting perpendicularly from one of said faces and orthogonally translating into the other of said faces; and quick locking means applying an axial pull to said locking stub to keep said rest and seating faces forced against each other.

The spraygun body therefore will be assembled and by means of an orthogonal translation it will press against the foundation seating face, while the positioning means and the projecting stub enter their respective receptacles due to translating orthogonally to said faces, as a result of which the seals are free both of shearing stresses and frictional forces, instead being merely compressed in admissible manner between the rest and seating faces. Upon actuation of the quick connect means, they will pull the locking stub parallel to its axis in a manner to clamp said rest face against said seating face, thus compressing in admissible manner the seals perpendicularly to said faces, as a result of which any leak at the junction between the feed conduits is precluded. Combining the positioning means and the projecting stub kept in place by the locking means precludes any rotation and any displacement of the spraygun body relative to the foundation.

Preferably the locking means are mounted in rotatable manner about an axis which is substantially perpendicular to the locking stub and they may convert their rotation about their axis into an axial pulling motion of said locking stub.

In this manner the spraygun body is quickly locked without rotation, without moving it relative to the foundation, even without using tools, the locking means being driven by a rotary handle or the like.

In one advantageous embodiment mode, the locking stub projecting from one of the rest/seating faces enters a housing in the other of said faces and the locking means are configured within a cavity pointing in substantially perpendicular and cooperating manner with said housing entered by said projecting locking stub.

In this manner the locking system can be wholly integrated inside the foundation or optionally inside the spraygun body.

In one advantageous embodiment mode, the locking stub comprises a rod and a protruding head wider than said rod. In this manner said locking means are able to clamp and rest against the head's base to pull on said locking stub.

In another advantageous embodiment mode keeping in place the projecting head stub, the locking means exhibit a hollow barrel of geometry of revolution, said barrel being fitted with a cavity parallel to the axis intersecting a radial cavity of a width larger than that of the width of the head of said locking stub, said axial and radial cavities communicating through a transverse slot with said barrel, said slot exhibiting a width larger than that of the said locking stub rod but less than the width of said locking stub head.

Accordingly, the stub fitted with a head enters the wide radial cavity and, following barrel rotation, the said head is kept clamped in place in the narrow annular slot.

In such an embodiment mode, to assure that the stub is pulled in a direction parallel to itself, the locking means of said locking stub comprises at least one ramp able to rest against the said stub's base, said ramp being implemented by a variable thickness of said hollowed barrel and allowing pulling said locking stub.

Accordingly said slope(s) on each side of the slot may exhibit an increasing thickness over a portion of the rotational excursion of the locking means, allowing pulling the stub by resting against the foundation of this stub's head.

In another embodiment mode of the present invention, the positioning means comprise at least one centering pin configured in a way to project orthogonally from one of said faces and allowing it to enter at least one housing fitted into the other of said faces by means of a translation orthogonal to them.

In this manner the spraygun body is engaged and assembled to the foundation solely by being translated orthogonally to the rest and seating faces and such a centering pin will affix the rest face relatively to the seating face in the directions parallel to them. Any rotation is precluded, and hence immobility is gained, by combining the engagement of this centering pin with the locking stub.

In another advantageous embodiment mode of the present invention, at least one tubular socket is inserted into at least one junction between a first spraygun feed conduit and a matching feed conduit of the foundation, the tubular socket comprising one portion that is inserted into the said first feed conduit and one portion that is inserted into the said second feed conduit.

Such a tubular socket allows further improving the sealing of the feed conduits of the foundation and of the spraygun body at their junction. Moreover the tubular socket may advantageously act as a positioning means replacing said centering pin because it allows orthogonally engaging, by translation, the spraygun body on the foundation face while affixing, in their plane, the rest face relative to the seating face.

BRIEF DESCRIPTION OF THE DRAWINGS

The Figures of the appended drawing elucidate the present invention. Identical references shown in different Figures denote identical elements.

DETAILED DESCRIPTION OF THE EMBODIMENTS

Figure 1:
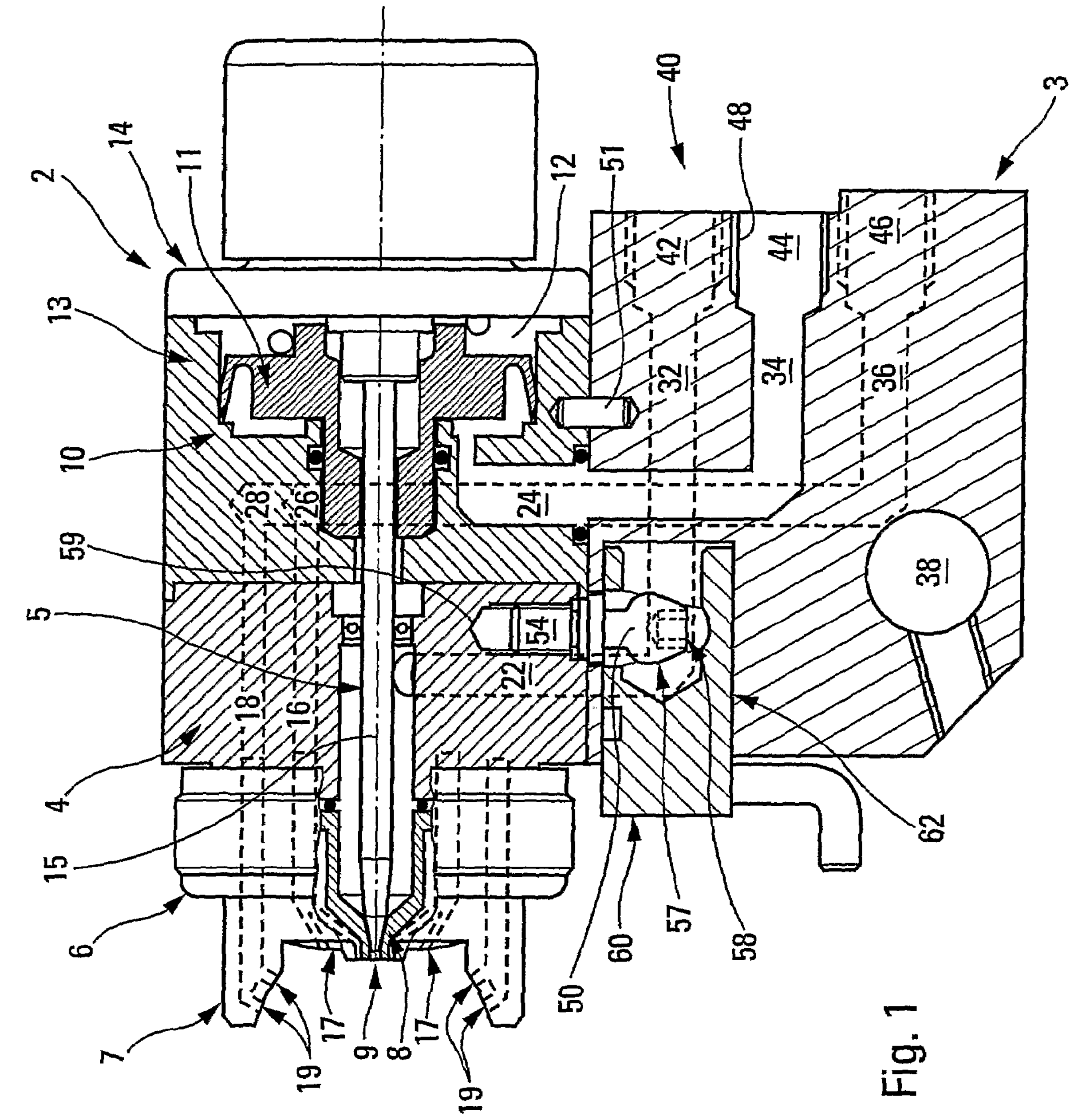
FIG. 1 is a lengthwise section of a spraygun body mounted on a foundation of the invention.

Generally speaking, the automated spraygun 1 of the invention, which is shown in schematic cross-section in FIG. 1, consists of a spraygun body 2 containing product spray/atomizing means using pressurized gas and assembled onto a foundation 3 connecting feeds of spray product and of pressurized gas (usually compressed air).

The spraygun body 2 is known and comprises several parts that are assembled in the planes of transverse joints. Be it borne in mind that said body comprises a front part holding a product chamber 5 preceded by a spray head 6 including a gas blowing hood 7 and a nozzle 8 fitted with a spray orifice 9.

Illustratively the spray head is such as described in the French patent documents FR-A-2,788,231 and FR-A 2,839,663.

The spraygun body 2 comprises a pneumatic drive compartment 10 having a piston 11 received in a drive compartment chamber 12 in the rear part 13 of the spraygun and sealed by a rear jar 14 fitted with a spray control button. The drive chamber drives a needle 15 that hermetically crosses the two chambers and is fitted at its front end with a tip able to seal off said orifice 9. The spraygun body 2 moreover also may include a middle part optionally having an omitted propelling gas chamber communicating with the vents 17, 19 of the gas blowing hood 7 by means of ducts 16, 18 passing through the spraygun front part 4 and the edges of said gas blowing hood 7.

Several feed conduits 22, 24, 26, 28 run through the spraygun body 2 to feed the product chamber 5 with pressurized spraying product and to feed with pressurized gas the displacement chamber 12 as well as the spray and shaping vents 17, 19 or the optional propelling gas chamber.

In the embodiment mode shown in FIG. 1, the product chamber 5 at the front of the spraygun communicates with an atomization/spray product feed conduit 22 and with a product return conduit serving to recycle said product. These two product feed conduits (only one, namely 22 being shown in dotted lines in FIG. 1) in general are configured symmetrically to a vertical, longitudinal plane and they issue through two lateral orifices 21 and 23 into a rest face 20 of the spraygun body 2 as shown in FIG. 2.

A pressurized gas (compressed air) feed conduit 24 to actuate the said drive chamber runs through the spraygun body and connects the drive chamber 12 to an orifice 25 in the rest face 20 (in this instance shown in the middle position). Two pressurized gas feed conduits 26, 28 run through the body 2 and connect two orifices 27, 29 in the rest face 20 to the ducts 16, 18 respectively leading to the vents 17, 19 that spray and shape the stream of atomized product.

Figure 2:
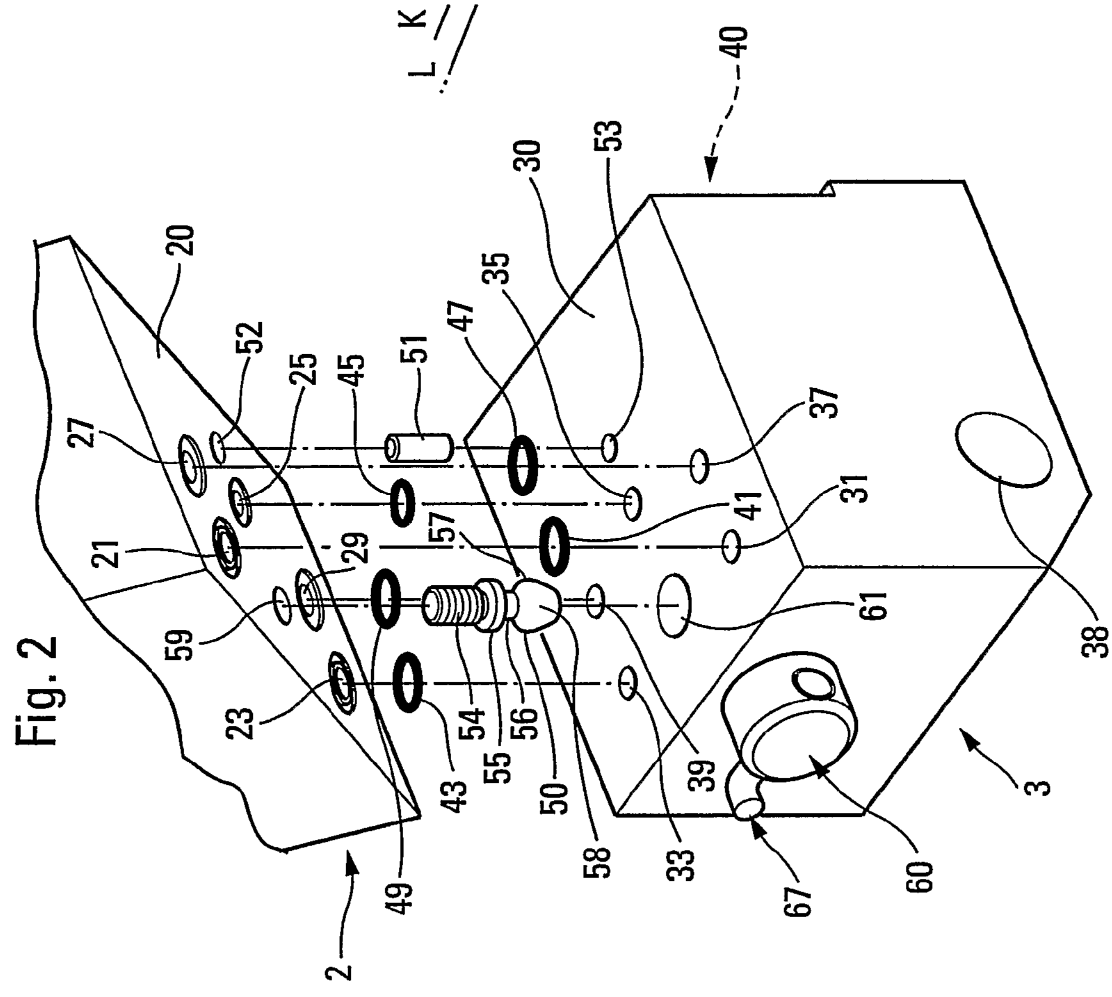
FIG. 2 is an exploded perspective partial view of the spraygun body separated from the foundation and shows the seals, the positioning means and the locking means of the invention.

The rest face 20 of the spraygun 2 shown in perspective in FIG. 2 therefore is fitted with plurality of orifices 21, 23, 25, 27, 29 of spraygun feed conduits feeding atomization product and pressurized gas, being several, from 2 to 5, even more, and being denoted in the present invention as "first orifices".

Preferably the rest face 20 of the spraygun body 2 shall be plane and be forced on the foundation 3 against a seating face 30 which is also plane.

The foundation 3 is fitted with feed conduits 32, 34, 36 which are complementary to the feed conduits 22, 24, 26 of the spraygun 2 and which run between the seating face 30 and a connection face 40 which in this instance is at the foundation's rear side.

The connection orifices 42, 44, 46 of the feed conduits 32, 34, 36 are fitted by connector elements 48 to spray product and pressurized gas feed tubes, such connector elements illustratively being threads 48, quick-connect parts, jacks or other equivalent elements.

The feed conduit orifices issuing into the foundation's seating face 30 are denoted as "second orifices" and are configured in a manner that each second orifice 31, 33, 35, 37, 39 shall coincide with the position of a corresponding first orifice 21, 23, 25, 27, 29 in the rest face 20 of the spraygun 2.

In the illustrative embodiment mode of FIG. 2, the peripheral rims of the first orifices 25 are designed to each receive an O-ring 45. The pressurized gas feed orifices 25, 27, 29 illustratively are each fitted with a countersink of which the geometry is equal to or slightly less than that of the seals 45, 47, 49. Each spray product feed orifice 21, 23 is enclosed by an annular groove that is concentric with the orifice and designed to receive an O-ring 41, 43 but does NOT communicate with the orifice 21, 23 in order to preclude contact between the O-ring and the potentially corrosive spray product, for instance enamel.

The foundation comprises an affixation fitting 38 to allow assembly in oriented manner on a work station's support arm.

In the present invention, the automated spraygun is fitted with positioning means 51, further with a projecting locking stub 50 and means 60 to lock said stub.

As shown in the embodiment modes of FIGS. 1 and 2, the positioning means are implemented by a centering pin 51.

The pin 51 comprises a portion that shall enter a receptacle 52 in the spraygun body 2 in a manner to orthogonally project from the rest face 20 and another portion that shall enter another complementary receptacle 53 in the seating face 30 of the foundation 3.

Such a pin 51 allows positioning the spraygun body rest surface 20 against the foundation seating face 30, thereby forming a connection eliminating two degrees of freedom in the translation directions parallel to said faces while conserving the freedom to mount the spraygun body 2 on the foundation 3 by a translation which is perpendicular to said faces 20 and 30.

As shown in the Figures, the locking stub 50 is affixed to the spraygun body 2 in a manner to project perpendicularly from the rest surface 20.

The locking stub 50 of the embodiment mode of FIG. 2 comprises a threaded cylindrical rod 54 fitted with a bulbous stop and with a projecting head 57 at least approximately in the form of a frustrum of cone. The head 57 and the collar 55 exhibit a diameter larger than that of the rod 54, whereby the gap between head and collar subtends a constriction 56. Near the constriction 56, the projecting head 57 is rounded to subtend at least approximately a spherical surface 58.

The stub 50 is affixed in a threaded recess 59 in the rest surface of the spraygun body 2 in a manner that the head 57 shall project from said rest surface 20.

A receptacle 61 of which the dimensions are larger than the diameter of the stub head 57 is present in the seating face 30 of the foundation 3 in a position matching the projecting locking stub 54.

Said receptacle 61 perpendicular to the seating face 30 communicates with a hollow 62 fitted parallel to said seating face into the foundation 3.

Preferably the hollow 62 is cylindrical and acts as a housing for a locking barrel 60.

As shown in detail in FIG. 3, the barrel 60 exhibits an overall cylindrical surface of revolution having an axis L-L and comprises a cylindrical cavity 63 having an axis K-K parallel to the axis L-L but spaced from it as is elucidated below.

A radial cavity 64 issuing into the axial cavity 63 is present in the barrel 60 at the level and site of the projecting stub 50. Moreover a transverse slot 65 runs from the radial cavity 64 to a diametrically opposite zone 66 in a transverse plane P which preferably is perpendicular to the barrel axis L-L. The slot 65 subtends an arc of circle of the barrel cylinder (for instance a semi-circle or an arc of about 160 to 200°, even a quarter or three-quarters of a circle.

The slot 65 and the radial cavity 64 communicating with each other issue into the axial cavity 63.

The diameters of the axial and radial cavities 63 and 64 are larger than the dimensions and the diameter of the head 57 of the projecting stub 50 whereas the width of the slot 65 is less than the diameter of the head 57 and larger than the diameter or the rod 54 or of the constriction 56 of the stub 50.

The length of the locking barrel 50 exceeds that of its housing hollow 62, as a result of which one end of the barrel 60 projects outside the foundation when the cylinder of the barrel 60 is inserted into the hollow 62 of the foundation 3. The projecting end of the barrel 60 is fitted with a small rotary locking handle 67.

In the course of the assembly procedure, the spraygun body 2 is mounted in translating manner in the direction of the foundation 3 perpendicularly to the rest and seating faces 20 and 30 respectively, whereupon the centering pin 51 and the locking stub 50 enter their respective receptacles 53 and 61 until this rest face 20 shall press against the seating face 30 of the foundation 3.

Figure 4A:
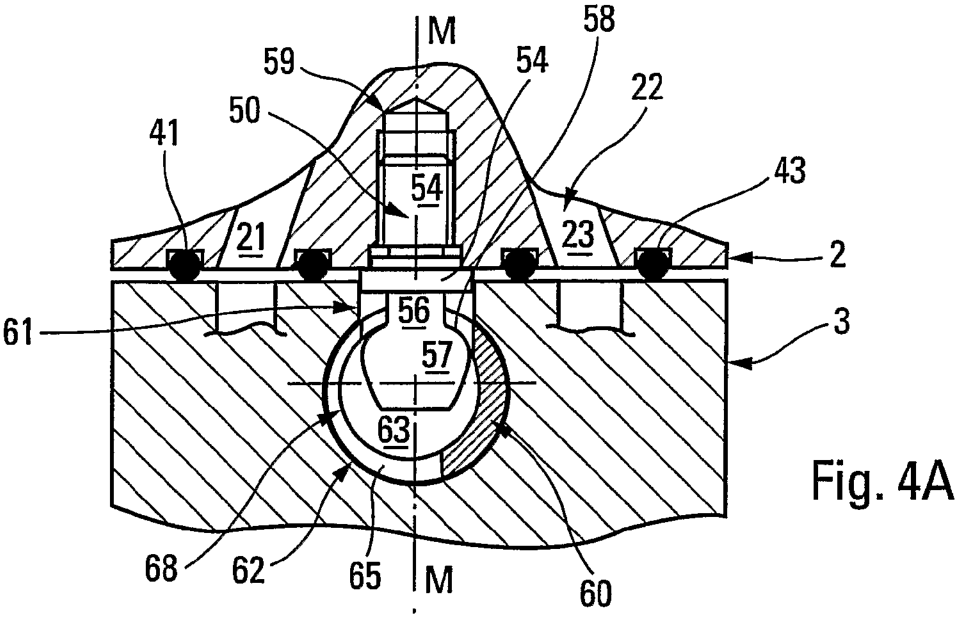
FIGS. 4A, 4B, 4C are cross-sectional views of a locking sequence at the locking means of the invention.
Figure 4B:
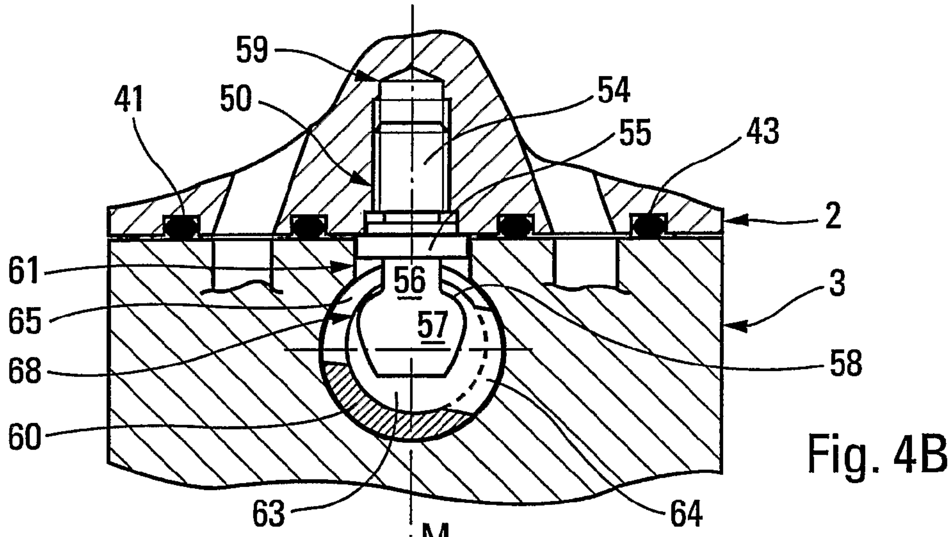
Figure 4C:
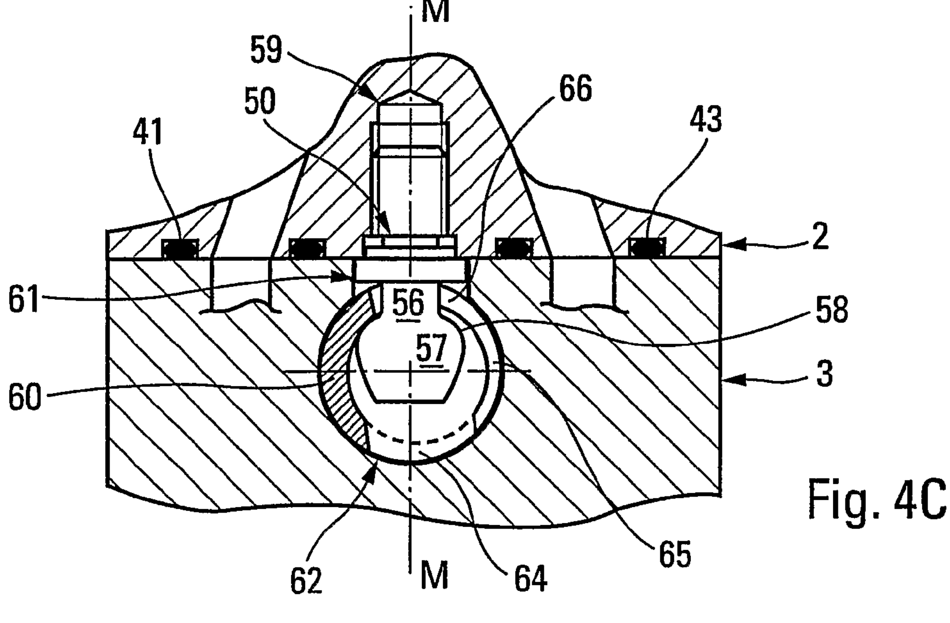

As shown in detail in the locking sequence illustrated by FIGS. 4A, 4B and 4C, the locking barrel 60 initially is moved into a starting angular position wherein its radial cavity 64 coincides with the receptacle 61 of the foundation 3 that is being entered by the projecting locking stub 50. The stub head 57 issues into the axial cavity 63 of the barrel 60. In this position, which is shown by FIG. 4A, the spraygun body rest face 20 rests by means of the uncompressed seals 41, 43 against the seating face 30.

By means of the small rotary locking handle 67 the barrel 60 is illustratively rotated clockwise and the constriction 56 of the stub thereby enters the barrel slot 65. The stub head 57 now is trapped in the barrel's axial cavity 63, the base of the head 57 being enclosed by two cylindrical wall portions 68 of the barrel 60.

In this intermediate angular locking position of about a quarter turn (FIG. 4B), the spraygun body 2 is merely kept in place on the foundation 3, the seals 41, 43 being slightly compressed between the rest and seating surfaces 20 and 30.

Because the axis K-K of the axial cavity 63 of the barrel 60 is offset to run parallel to the longitudinal barrel axis L-L, the cylindrical walls 68 of the barrel 60 will exhibit a variable radial thickness. The axial cavity 63 is excentric to come closer to the radial cavity 64. As a result the thickness of the walls 68 of the barrel varies between a minimum thickness in the region of the radial cavity 64 and a maximum thickness in a diametrically opposite region 66.

As a result and in this manner, the two portions of the barrel walls 68 enclosing the base of the stub head 57 subtend two ramps 68 of increasing thickness in the direction of locking.

Accordingly, during the locking procedure, said two barrel ramps 68 cooperating with the spherical surface of the head 57 apply an increasing pull on the head 57 of the projecting stub 57 in a direction parallel to this stub, that is, perpendicularly to the rest and seating faces 20, 30.

Accordingly and in the advantageous manner of the present invention, the rest face 20 of the spraygun body 2 is pulled in translating manner orthogonally to itself until it is forced against the seating face 30 of the foundation 3 and until the seals shall be fully compressed (FIG. 4C). Throughout the entire assembly and locking procedure, the seals 41, 43 are compressed in admissible manner between the rest and seating faces 20 and 30 without being subjected to shearing or friction.

Therefore, when the final locking position has been reached, the spraygun body 2 shall be affixed in fully abutting and compressed manner against the foundation 3.

In that position, the locking barrel 60 itself is kept irrotational by the clamping stresses. Moreover the case of the barrel 60 no longer is able to translate axially.

Figure 6:
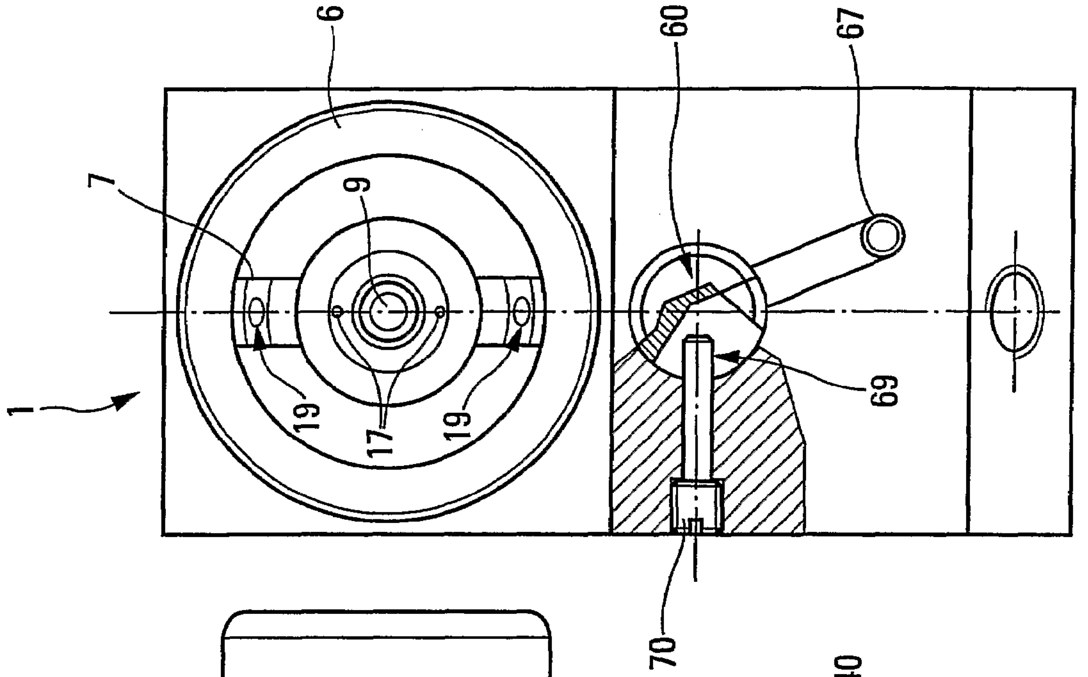
FIG. 6 is a front view of the automated spraygun of FIG. 5 and shows also a partial section of the locking barrel key of the invention.
Figure 5:
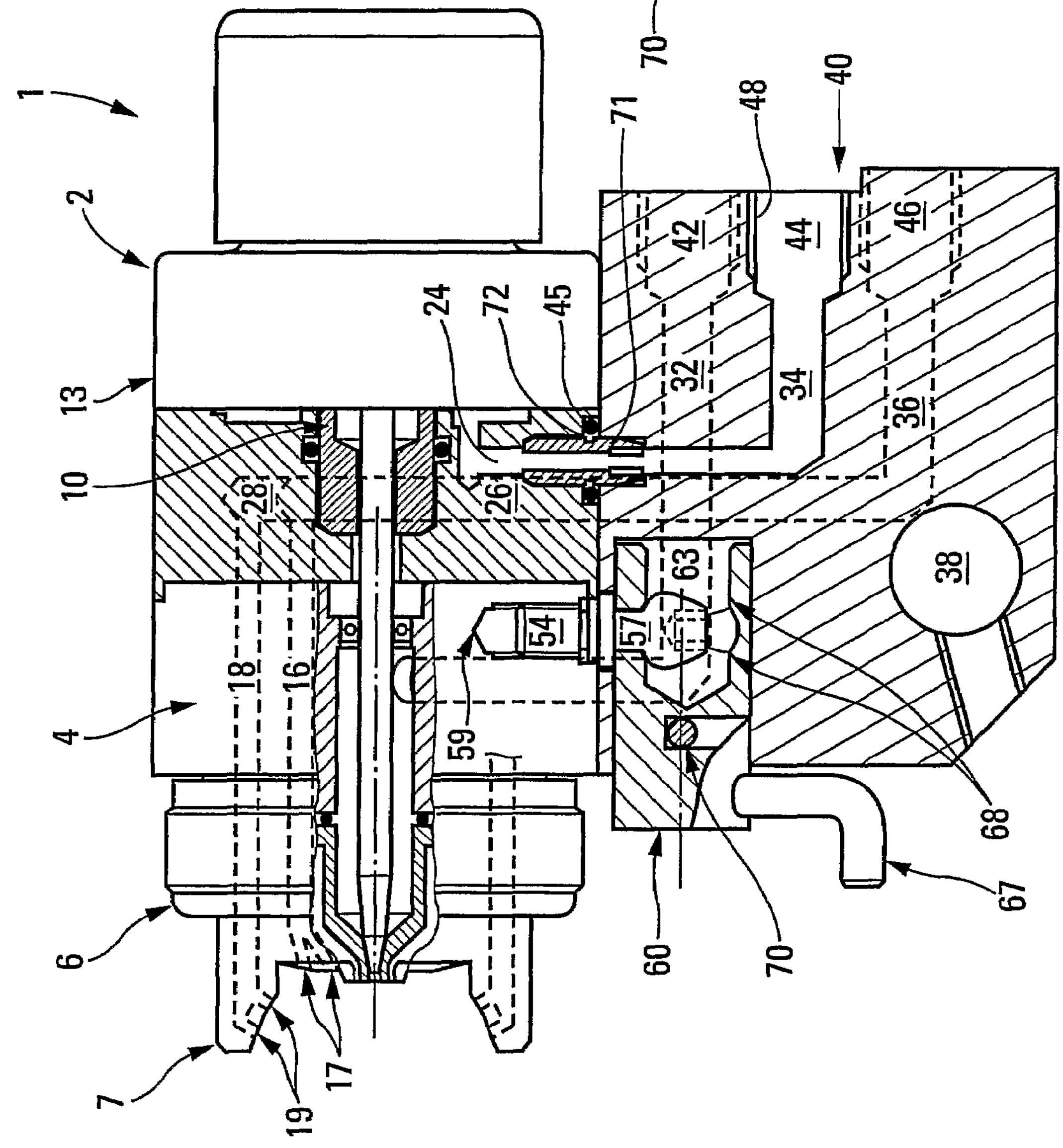
FIG. 5 is a longitudinal section of a spraygun body assembled to a foundation, with inserted tubular socket, of one embodiment variation of the invention.

On the other hand, to preclude the barrel 60 from escaping from the foundation 3 when the spraygun body 2 is apart from the foundation 3, advantageously, and as shown in FIGS. 5 and 6, the cylindrical barrel 60 shall be kept in its cylindrical housing hollow 62 by means of longitudinally affixing elements 70.

Figure 3:
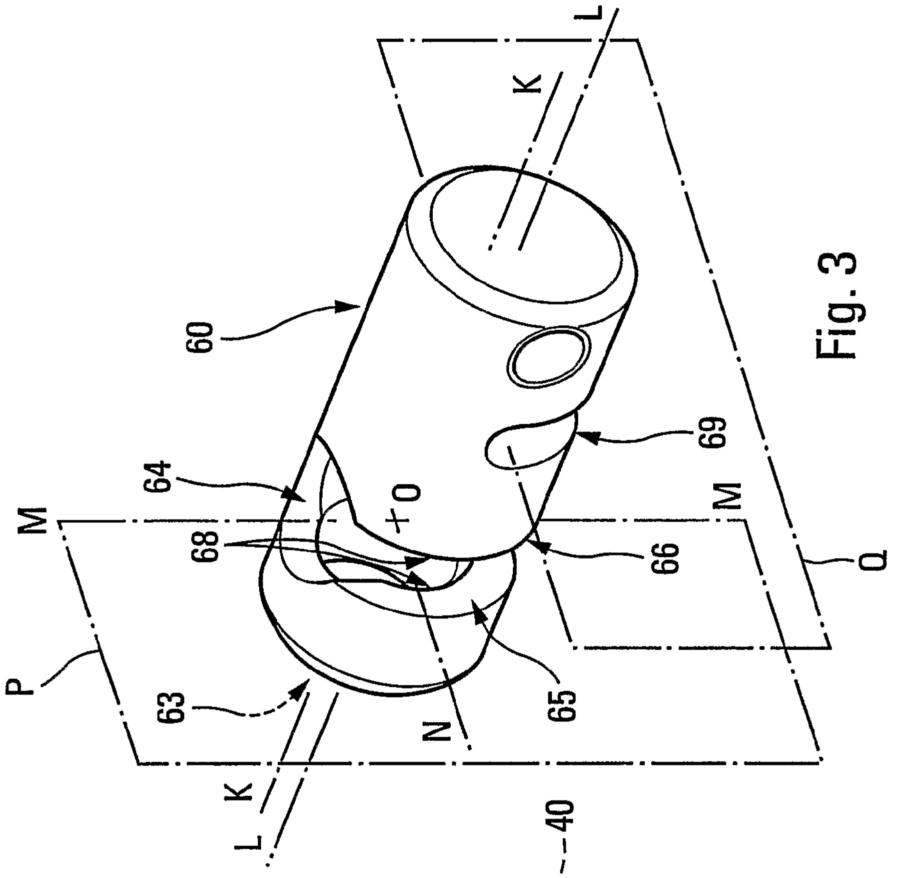
FIG. 3 is a detailed perspective of the locking barrel of the invention.

As shown in FIG. 3, the barrel 60 is fitted with an annular recess 69 hollowed into the full circumference or preferably into an arc of circle of the cylinder of the barrel 60, for instance half a turn. A retaining screw 70 is screwed through the foundation 3 to engage the recess 69 and to longitudinally affix the barrel 60 in the hollow 62 while allowing it to rotate over a fraction of one revolution.

FIG. 5 shows an embodiment mode variation wherein a tubular socket 71 is inserted into the junction between a first feed conduit 24 of the spraygun body 2 and a second complementary feed conduit 34 of the foundation 3. The tubular socket comprises a portion which enters the first conduit 24 and a portion which enters the second conduit 34. The inside diameter of the tubular socket 71 preferably is substantially the same as the inside diameter of said conduits 24 and 34. The periphery of said conduits' orifices is made to match using a countersink having a diameter corresponding to the outside diameter of the tubular socket 71 at a depth that corresponds to the depth of insertion of each portion of the socket 71.

An annular groove 72 is fitted into the outer walls of the socket 71 at its center position to receive an O-ring 45.

Accordingly the seal is kept in place when the spraygun body 2 is mounted on the foundation 3 and it cannot escape or be mis-positioned between the two rest and seating faces. Moreover such a tubular socket 71 per se may be used as a means positioning the rest face 20 of the spraygun body relative to the foundation's seating face 30, said tubular positioning socket replacing the positioning stud or pin 51.

Be it borne in mind that in general other positioning means may be substituted for the positioning cylindrical element or tubular socket, for instance contacting or linking elements eliminating only one translational degree of freedom parallel to said faces, such as a tongue and groove system or complementary nesting elements fitted into the rest and seating faces.

The invention claimed is:

1. An automated spraygun to spray/atomize a product, said spraygun comprising:

a spraygun body that includes several first feed conduits for feeding the product to be sprayed and a pressurized gas, and a rest face into which said first feed conduits issue in the form of first orifices;

a foundation including a seating face against which said rest face is forced, and several second feed conduits that are complementary to said first feed conduits and terminate, on one hand, into connection elements to product and pressurized gas feeds and, on the other hand, into second orifices in said seating face, said first and second orifices being configured in a manner that each of the first orifices coincides with a respective one of the second orifices when said rest face of the spraygun body is forced against said seating face of the foundation;

seals to be inserted between said seating face and said rest face and peripherally located at each junction between the respective first and second orifices; and assembly and locking means for allowing quick assembly and locking of said spraygun body to said foundation;

wherein said assembly and locking means comprise:

positioning means for positioning said spraygun body on said seating face and adapted to project perpendicularly from one of said rest and seating faces and to translate orthogonally into the other of said rest and seating faces in a manner to position said rest face relative to said foundation face in their plane;

a locking stub projecting perpendicularly from one of said rest and seating faces and orthogonally translating into the other of said rest and seating faces; and quick locking means for applying an axial pull on said locking stub to keep said rest and seating faces forced against each other;

wherein said locking means for said locking stub are rotatably mounted about an axis which is substantially perpendicular to said stub and are adapted to convert their rotation about the axis to an axial pull motion of said locking stub; and said locking means include a barrel having an axial cavity that runs parallel to its axis, a radial cavity intersecting with the axial cavity and exhibiting a width larger than that of a head of said locking stub, and a slot which is transverse to said barrel, which communicates with said axial and radial cavities, and which exhibits a width larger than that of a rod of said locking stub but less than that of the head of said locking stub.

2. An automated spraygun as claimed in claim 1, wherein said locking means of said locking stub comprises at least one ramp adapted to rest against a base of said stub's head and created by a thickness variation in said hollowed barrel and enabling pulling said locking stub.

3. An automated spraygun as claimed in claim 1, wherein the barrel is cylindrical and comprises anti-translation keying means.

4. An automated spraygun as claimed in claim 1, wherein said positioning means at least comprise one centering pin configured in a manner to perpendicularly project from one of said rest and seating faces and adapted to enter at least one receptacle on the other of said rest and seating faces by translating perpendicularly to said rest and seating faces.

5. An automated spraygun as claimed in claim 1, further comprising:

at least one tubular socket adapted to enter the junction between one of the first feed conduits of the spraygun body and the respective second feed conduit of the foundation, said tubular socket comprising a first portion adapted to enter the first orifice of said first feed conduit and a second portion adapted to enter the second orifice of said respective second feed conduit.

6. An automated spraygun, comprising:

a spraygun body comprising a rest face on which a first orifice of a first conduit is formed;

a foundation comprising a seating face on which a second orifice of a second conduit is formed corresponding to the first orifice so that the first and second conduits define a path for feeding a product to be sprayed or a pressurized gas;

a seal between said seating and rest faces for sealing a junction between the first and second orifices;

a locking member in one of said spraygun body and foundation; and a locking rod projecting from the other of said spraygun body and foundation and engageable with said locking member;

wherein said locking member is rotatable, while engaging said locking rod, about a first axis oriented in a first direction to pull the rest and seating faces toward each other in a second direction transverse to the first direction;

wherein said locking rod comprises a shank and a head having a larger width than said shank; and wherein said locking member includes:

a barrel having an axial cavity that runs parallel to said axis;

a radial cavity intersecting with the axial cavity and having a width larger than that of the head of said locking rod; and a slot which is transverse to said barrel, which communicates with said axial and radial cavities, and which has a width larger than that of the shank of said locking rod but less than that of the head of said locking rod.

7. An automated spraygun as claimed in claim 6, further comprising:

a positioning element for aligning the first and second orifices and restricting relative motion between the said spraygun body and foundation to translational movements along said second direction.

8. An automated spraygun as claimed in claim 7, wherein said positioning element comprises at least one tubular socket comprising a first portion adapted to enter the first orifice and a second portion adapted to enter the second orifice.

9. An automated spraygun as claimed in 6, wherein said second direction is perpendicular to the rest and seating faces, and said first direction is perpendicular to said second direction.

10. An automated spraygun as claimed in claim 6, wherein said locking member comprises at least a cam surface adapted to rest against the head of said locking rod and increasingly pull the locking rod, hence the other of said spraygun body and foundation, toward said one of said spraygun body and foundation as the locking member is rotated.

11. An automated spraygun as claimed in claim 10, wherein said cam surface is defined by an axial cavity positioned eccentrically in said locking member.

12. An automated spraygun, comprising:

a spraygun body comprising a rest face on which a first orifice of a first conduit is formed;

a foundation comprising a seating face on which a second orifice of a second conduit is formed corresponding to the first orifice so that the first and second conduits define a path for feeding a product to be sprayed or a pressurized gas;

a seal between said seating and rest faces for sealing a junction between the first and second orifices;

a locking member in one of said spraygun body and foundation; and a locking rod projecting from the other of said spraygun body and foundation and engageable with said locking member;

wherein said locking member is rotatable, while engaging said locking rod, about a first axis oriented in a first direction to pull the rest and seating faces toward each other in a second direction transverse to the first direction;

wherein said locking rod comprises a shank and a head having a larger width than said shank; and wherein said locking member is a barrel having an axial cavity which has a second axis parallel to but offset from the first axis about which said barrel is rotatable, and the head of said locking rod is engageable with an inner wall of the axial cavity and is pulled by the inner wall of the axial cavity toward said barrel as the barrel is rotated about the first axis.

* * * * *

UNITED STATES PATENT AND TRADEMARK OFFICE

CERTIFICATE OF CORRECTION

PATENT NO. : 7,661,606 B2
APPLICATION NO. : 11/571958
DATED : February 16, 2010
INVENTOR(S) : Eric Vacher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 281 days.

Signed and Sealed this

Thirtieth Day of November, 2010

David J. Kappos
*Director of the United States Patent and Trademark Office*